Jan. 22, 1946. W. C. EDWARDS, JR., ET AL 2,393,317
STRAIGHTENING PRESS FOR AIRCRAFT PROPELLERS AND THE LIKE
Filed Feb. 9, 1944 3 Sheets-Sheet 1

INVENTORS
WILLIAM C. EDWARDS, JR.
ROBERT P. ELAM
BY Joseph Hazell
Clade Koontz
ATTORNEYS

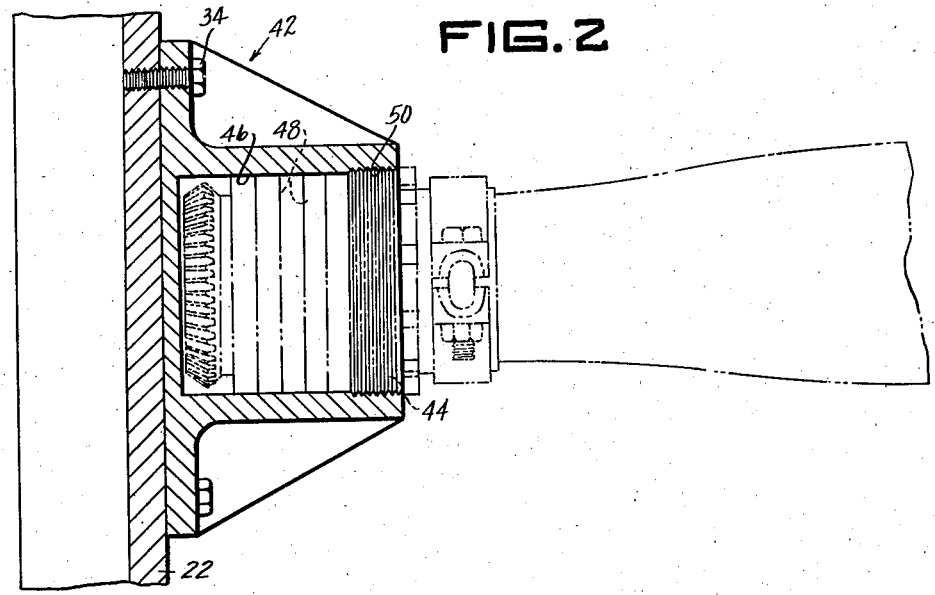
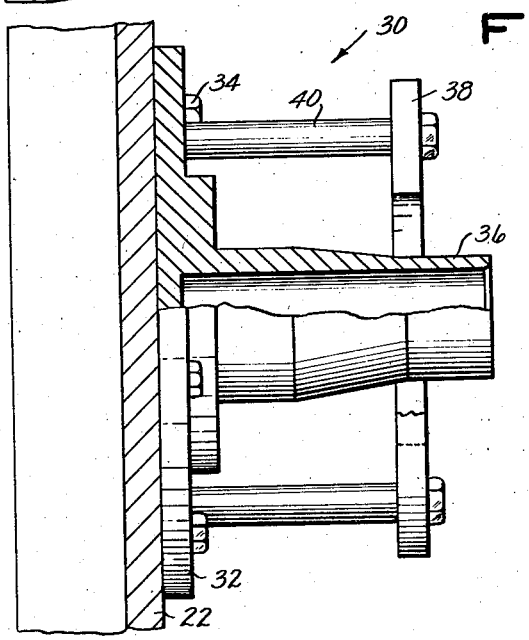

Jan. 22, 1946. W. C. EDWARDS, JR., ET AL 2,393,317
STRAIGHTENING PRESS FOR AIRCRAFT PROPELLERS AND THE LIKE
Filed Feb. 9, 1944 3 Sheets-Sheet 3

INVENTORS
WILLIAM C. EDWARDS, JR.
ROBERT P. ELAM
ATTORNEYS

Patented Jan. 22, 1946

2,393,317

UNITED STATES PATENT OFFICE 2,393,317

STRAIGHTENING PRESS FOR AIRCRAFT PROPELLERS AND THE LIKE

William C. Edwards, Jr., and Robert P. Elam, Dayton, Ohio

Application February 9, 1944, Serial No. 521,610

1 Claim. (Cl. 153—32)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to straightening presses, and is particularly useful in straightening propellers, landing gear forks and similar aircraft parts.

According to well established rules in propeller blade design, every part of the surface of a variable pitch propeller blade must be in an exact position with respect to the axis of the shank upon which the blade turns when changing the pitch. For this reason it is practically impossible to straighten a bent or twisted propeller blade in any of the straightening presses which are commercially available at this time.

It is therefore an object of this invention to provide a press in which the shank of the propeller blade or similar part is held in the press with its axis parallel to the plane of a gauging surface from which selected parts of the surface of the blade may be checked to determine whether a selected point on the surface is in proper relation with the shank axis, together with means to bend or twist any part of a blade to bring the gauged points in their proper position.

Another object is to provide a press in which a matched pair of blades may be straightened at the same time to the end that less frequent resettings of the gauge means will be required.

Other objects and advantages will be seen as the invention is further described and reference is made to the drawings wherein:

Fig. 2 is a cross-sectional view of one form of fixture used on the press for supporting the shank of a propeller blade.

Fig. 3 is a cross-sectional view of another form of fixture used on the press for supporting the shank of a propeller blade.

Like reference characters refer to like parts throughout the several views.

Figure 1:
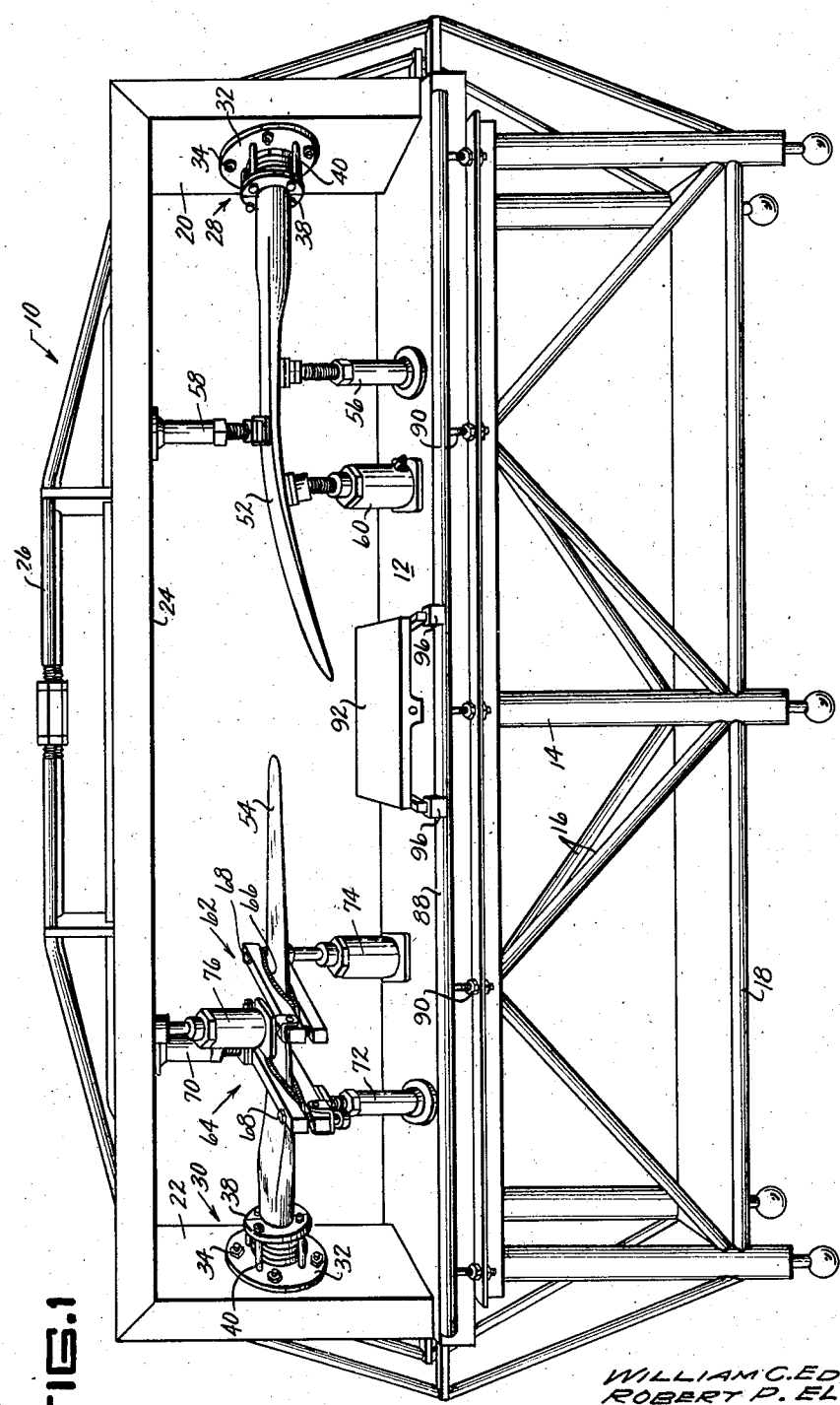
Fig. 1 is a perspective view of a press which embodies the principles of the invention, arranged for straightening a pair of propeller blades simultaneously.

Referring now to the drawings, a press 10, which is to serve as an illustrative embodiment of subject invention, consists essentially of a table 12, which may be provided with legs 14 braced as at 16 and 18, end housings 20 and 22, which may be integral or permanently secured to the ends of the table, and a platen 24 integral with, or securely fastened on, the top ends of the housings, the whole being strengthened by struts 26, as shown.

Secured to the inside face of the end housings are adapters 28 and 30, which may preferably be in axial alignment one with the other, the axis of the adapters being parallel to the plane of the table top. Adapters 28 and 30, shown to a larger scale in Fig. 3, are designed to receive the shanks of a blade and clamp it so that the axis upon which the blade turns in changing the pitch is parallel to the plane of the table top. The adapters shown enlarged in Fig. 3 and in the press in Fig. 1, have bases 32 which are held by bolts 34 to the end housings, pilots 36 which fit the bore of the blade shank, and two-part clamping rings 38 which are drawn up by bolts 40 and thus engage shoulders on the blade shanks to secure the blades both against axial movement and against unwanted rotation.

An adapter 42, shown in Fig. 2, is provided for aligning blades by the outside of their shanks, this type of blade usually being provided with an externally threaded collar 44 and the adapter with a true bore 46 for the bearings 48, and an internal thread 50 into which the collar is screwed to clamp the blade in proper alignment. The adapter 42 has a base of the same dimensions as the adapter 30, is drilled for the bolts 34 and will interchange with the adapter 30 when required.

Mounted for straightening in the press 10 is a pair of blades 52 and 54, the blade 52 having been bent flatwise and the blade 54 having been twisted. For straightening the blade 52, the screw jacks 56 and 58 are set adjacent the bend and tightened after which the hydraulic jack 60 is used for bending the free end of the blade back into alignment.

Figure 4:
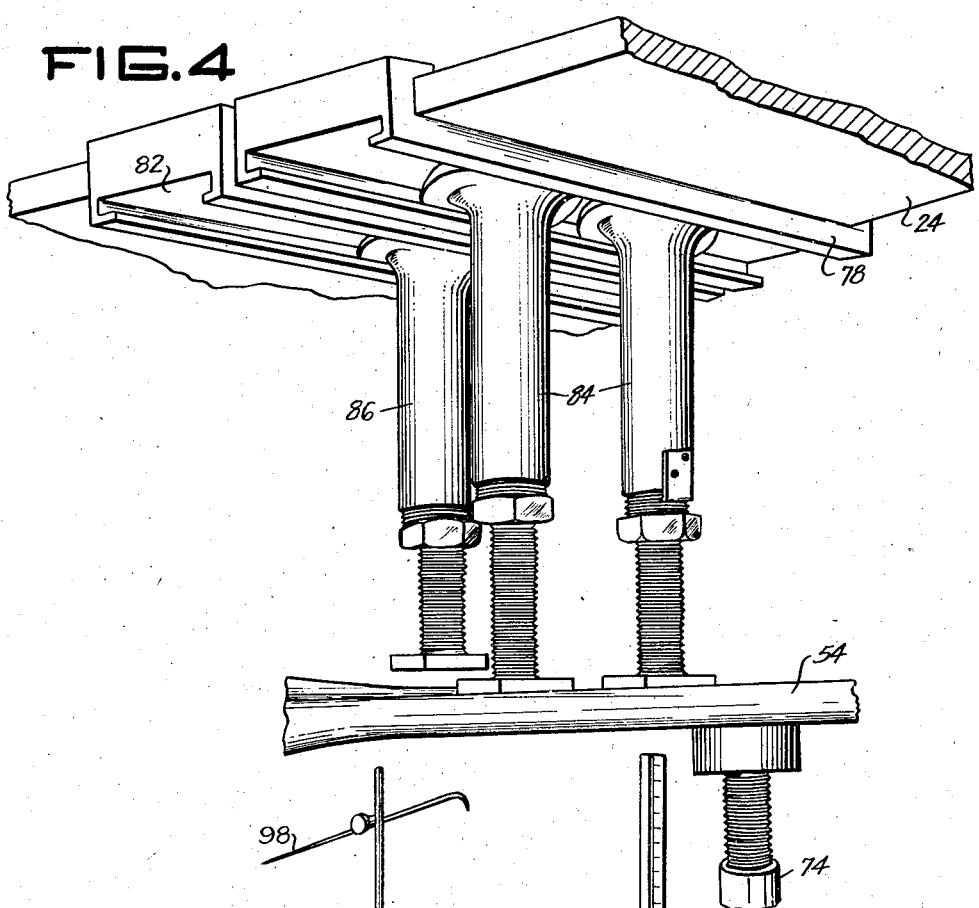
Fig. 4 is a perspective view of an arrangement for moving certain parts of the press to selected positions.
Figure 5:
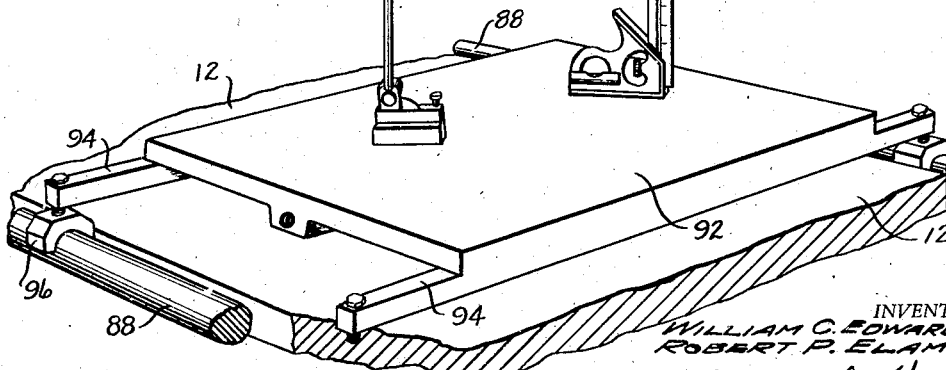
Fig. 5 is a perspective view showing the construction of the gauging means.

For removing the twist from the blade 54 a pair of clamps 62 and 64 is provided. Each clamp is in two parts hollowed out as at 66 to fit the blade contour and drawn together on the blade by screws 68. The clamps 62 and 64 are placed adjacent the portion of the blade which has the twist in it, the twisted portion being between the two clamps. Screw jacks 70 and 72 are placed and tightened against the ends of the clamp 64 as shown, and hydraulic jacks 74 and 76 are applied to the ends of the clamp 62 to whatever extent is required to remove the twist.

Where the nature of the work is such that a considerable number of screw jacks are needed on the upper side of a blade and it is required that they be moved to many different positions on the platen in straightening a single blade, an arrangement such as is shown in Fig. 4 is provided for movably suspending the jacks from the platen. Here a series of hangers 78 are slidable endwise on the platen 24, the hangers having T-slots 82 which extend through the hangers crosswise of the platen, and in which the bases of the screw jacks 84 are slidable. By this arrangement, movement of any of the screw jacks to any position on the platen is greatly facilitated. Moreover, such of the screw jacks as are not in immediate use may remain suspended as at 86 in an out of the way position from the platen.

The portion of the invention thus far described pertains entirely to the mechanism provided for making appropriate straightening bends in a damaged propeller blade. The mechanism for determining when a propeller blade has been properly straightened may be described as follows:

Supported along opposite sides of the table 12 are two bars 88, a series of adjusting screws 90 being spaced along the underside of the bars to compensate for any sag due to the weight of the bars. The two bars 88 are used as ways upon which a surface plate 92 may slide from one end to the other on the table 12, the top surface of the surface plate remaining at all times in a plane which is parallel to the common axis of the pilots 36. The surface plate 92 is carried on cross bars 94 which have guide blocks 96 secured to the outer ends of the bars. In order to simplify checking, the measurements from the top of the surface plate to the axis of the adapters 28 and 30 may preferably be in even inches.

In the working drawing of a propeller blade, a plurality of reference points on the surface of the blade are given with respect to their relation to the blade axis. Since it is impractical to measure the distance between a reference point on the surface of a blade and the axis of the pilots 36, the distance from the surface plate to the reference point is measured instead. This distance is readily found by adding or subtracting the dimension on the blade drawing to or from the distance from the surface plate to the axis of the pilot 36. This added distance may be set off with the pointer 98 on the scale 100 and compared with the surface being checked.

While the embodiment of the invention herein shown is arranged for operating on two blades simultaneously, it will, of course, be understood that one of the adapters 28 or 30 may be emitted and a machine thus provided for operating on one blade at a time, and while the drawings show the press only in the capacity of straightening propellers, it is easily understood that other aircraft parts, such, for instance, as landing gear forks, may as readily be straightened if suitable adapters for holding them in proper alignment are provided.

Having described our invention, we claim:

A press for straightening an aircraft propeller blade which comprises a frame structure, a table carried by said frame structure, a platen supported above said table by said frame structure, an adapter mounted on said frame structure for rotatably supporting a blade at one end only by its shank, positioned intermediate said table and said platen and with axis parallel to the plane of said table and of said platen, whereby a series of jacks may extend upwardly from the table, and a second series may depend from the platen, and be arranged along the axis of the blade or be displaced transversely thereto, guideways extending longitudinally of said table and parallel with the axis of said adapter, guide pieces slidable along said guideways, and a surface plate fast on said guide pieces, having its surface in a plane parallel to the axis of said blade, and a gage positioned on said surface, said plate being movable along said guideways into a position whereby the gage is located to measure the position of various parts of the blade established by said jacks.

WILLIAM C. EDWARDS, Jr.
ROBERT P. ELAM.